United States Patent [19]

Cady

[11] 4,262,399
[45] Apr. 21, 1981

[54] ULTRASONIC TRANSDUCER FABRICATED AS AN INTEGRAL PARK OF A MONOLITHIC INTEGRATED CIRCUIT

[75] Inventor: William R. Cady, Scotia, N.Y.

[73] Assignee: General Electric Co., Schenectady, N.Y.

[21] Appl. No.: 958,799

[22] Filed: Nov. 8, 1978

[51] Int. Cl.³ .................... H01G 7/00; H01L 21/308
[52] U.S. Cl. .................................. 29/25.42; 29/579;
156/653; 156/656; 156/657; 156/659.1;
156/662; 357/26; 357/51
[58] Field of Search ............ 156/653, 656, 657, 659.1,
156/662; 29/579, 602 A, 25.42; 357/26, 51;
427/88

[56] References Cited

U.S. PATENT DOCUMENTS

| 3,746,950 | 7/1973 | Kano et al. | 357/26 |
|---|---|---|---|
| 3,758,943 | 9/1973 | Shibata | 29/579 |
| 3,763,408 | 10/1973 | Kano et al. | 357/26 |
| 3,786,320 | 1/1974 | Kano et al. | 357/26 |
| 3,822,467 | 7/1974 | Symersky | 29/579 |
| 3,837,907 | 9/1974 | Berglund et al. | 156/659.1 |
| 3,941,630 | 3/1976 | Larrabee | 156/656 |
| 4,004,044 | 1/1977 | Franco et al. | 156/653 |
| 4,045,594 | 8/1977 | Maddocks | 29/579 |
| 4,060,427 | 11/1977 | Barile et al. | 156/653 |
| 4,078,963 | 3/1978 | Symersky | 156/659.1 |

Primary Examiner—Jerome W. Massie
Attorney, Agent, or Firm—Donald R. Campbell; James C. Davis; Marvin Snyder

[57] ABSTRACT

An array of electrostatic transducers is fabricated on a monolithic integrated circuit chip having provision for detection, amplification, and signal processing of received echoes. The transducer is multilayered with the form of a parallel plate capacitor, and is made by laterally etching an insulating layer through a small hole in the overlying layer to create a void region, then depositing a sealing layer to seal the etch holes. The upper metallic layers cover the transducer array and other monolithic circuitry and are etched to be interconnections for the various components.

8 Claims, 17 Drawing Figures

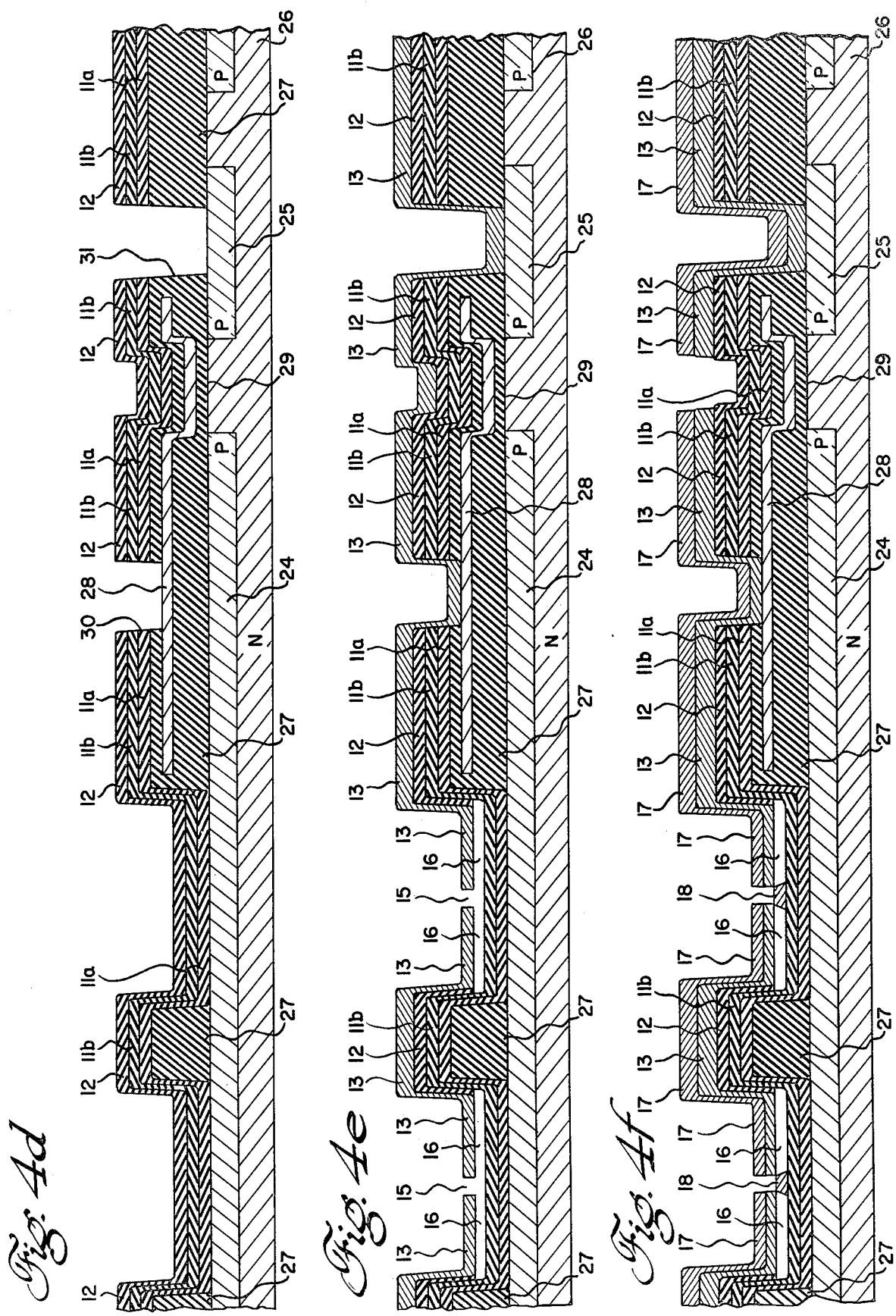

ULTRASONIC TRANSDUCER FABRICATED AS AN INTEGRAL PARK OF A MONOLITHIC INTEGRATED CIRCUIT

BACKGROUND OF THE INVENTION

This invention relates to ultrasonic receiving transducers, and especially to the combination of an electrostatic transducer and signal processing circuitry in a single monolithic circuit and to the fabrication of such transducers as a unique component during the processing of a monolithic integrated circuit.

Ultrasonic imaging requires an array of ultrasonic sensing elements capable of detecting a pattern of ultrasonic waves impinging upon its surface. The received echo signals from the sensing elements are amplified and electronically processed so that an image can be conveniently displayed on a viewing device. Current practice requires the sensing elements to be fabricated separately from the electronic circuitry, with each element connected by a discrete wire to the processing circuits or otherwise separately connected. Fabrication of the ultrasonic sensor and electronic processing circuitry in a single monolithic circuit will significantly reduce the difficulty in fabricating the array and make possible the manufacture of ultrasound systems and arrays with a larger number of sensing elements.

SUMMARY OF THE INVENTION

An ultrasonic receiving transducer for fabrication as an integral part of a monolithic integrated circuit is multilayered and has the form of a parallel plate capacitor with regions separating the "parallel plates" void of material. The method employs materials commonly used in manufacturing semiconductor monolithic circuits and the transducer is fabricated as a separate component during the processing of the monolithic integrated circuit. First and second continuous insulating layers and a third continuous layer, which is conductive, are deposited on the semiconductor substrate, and a plurality of etch holes are made in the third layer. The second insulating layer is etched using the apertured third layer as a mask to create void regions which extend laterally from each etch hole under the third layer. A conductive sealing layer is placed on the third layer and seals the etch holes and void regions to produce a transducer structure capable of sensing received echoes. Acoustical energy is detected as a change in capacitance resulting from a change in spacing between the substrate and an overlying conductive layer. Many variations are possible including a three-layer structure provided that the materials, nonconductive or conductive, are properly chosen. To reduce the inactive region capacitance between the transducer structures, a thick insulating layer is initially deposited on the substrate and holes are etched in the thick layer to define the active regions and the processing proceeds as just described.

The preferred method for fabricating the transducer in combination with electronic processing circuitry on a single chip is that standard processing is utilized to construct the electronic circuitry up to the stage where contact windows are to be etched and interconnections added. Part of the substrate area is reserved as the transducer region and may be protected by an insulating layer. The first and second insulating layers are now deposited over the entire integrated circuit, contact windows are etched, and the conducting third layer is deposited over the entire integrated circuit and etch holes are made. After lateral etching to create void regions, the sealing layer is deposited over the entire integrated circuit and it and third layer are patterned to establish interconnection of the transducer to the electronic circuitry and between elements of the electronic circuitry. The resulting chip has capability for the detection, amplification, and signal processing of received echoes and does not required discrete wire connections to the transducer array.

BRIEF DESCRIPTION OF THE DRAWINGS

FIGS. 4a–4f show steps in the processing of a monolithic integrated circuit having a transducer array and electronic circuitry on the same chip.

DESCRIPTION OF THE PREFERRED EMBODIMENTS

Figure 1A:
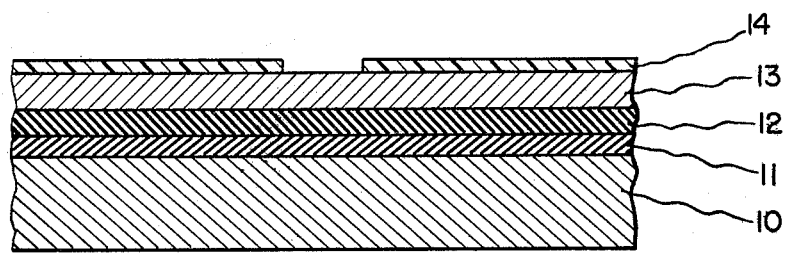
FIGS. 1a–1d are schematic cross sections illustrating steps in making a single electrostatic transducer element on a semiconductor substrate.
Figure 1B:
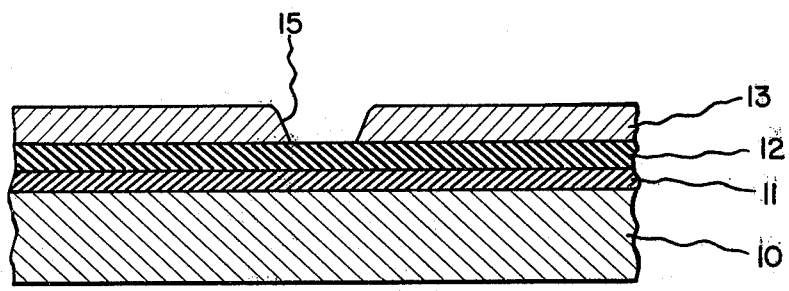
Figure 1C:
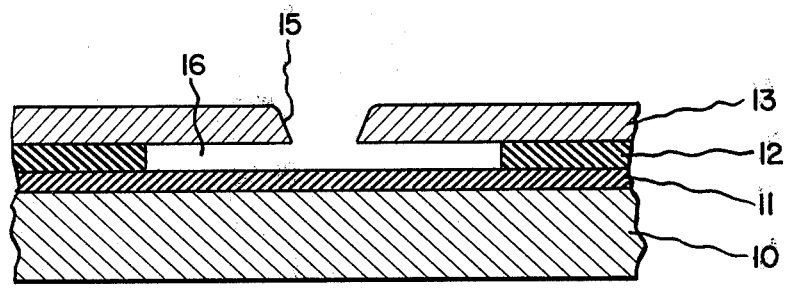
Figure 1D:
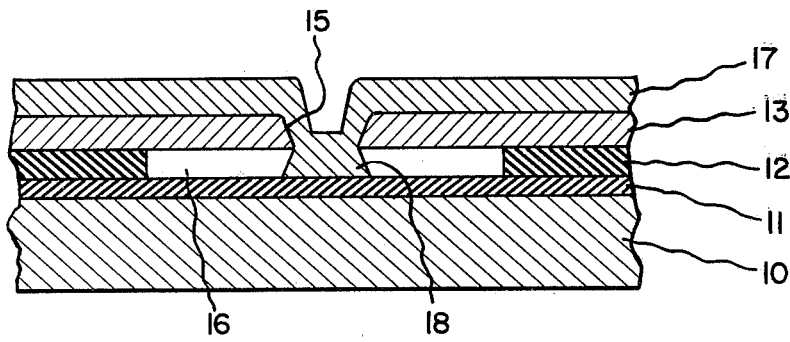

Basic fabrication of an individual electrostatic transducer for sensing acoustical energy is depicted in FIGS. 1a–1d, but it is appreciated that individual transducers are very small and that normally an array of such structures are batch processed and connected in parallel to operate as a transducer element. Substrate 10 in FIG. 1a is made of silicon or another semiconductor such as gallium arsenide. Two thin continuous layers 11 and 12 of different insulating materials are deposited over the surface of substrate 10, and a continuous conducting layer 13 is then deposited over the top insulating layer. A coating of photoresist 14 is patterned by exposure to light, and an etchant which attacks the conducting material but not the top insulating material produces a small circular etch hole 15 in layer 13. Photoresist mask 14 is now removed. Using conducting layer 13 as an etching mask, top insulating layer 12 is etched through hole 15 to create a circular void region 16 which extends from the etch hole laterally beneath conducting layer 13. By proper selection of materials, etching of top insulating layer 12 can be accomplished without significantly alterating either conducting layer 13 or first insulating layer 11. Finally, as shown in FIG. 1d, a continuous sealing layer 17 of conductive material is deposited on conducting layer 13 and seals the hole 15 in that layer. In the completed structure, apertured layer 13 projects over void region 16 and sealing layer 17 has a depending solid plug 18 which extends downwardly through etch hole 15 and contacts the underlying layer to seal off or substantially seal off the void region.

Assuming that a bias voltage is applied between substrate 10 and conducting layers 13 and 17, an ultrasonic wave impinging upon either the substrate or outer conducting layers causes a deformation of the respective surface and results in a change of capacitance of the device because the spacing between the parallel electrodes is changed. The alternating pressure causes the average spacing between the two electrodes to vary synchronously with the applied pressure. With a constant charge maintained on the capacitor plates, an alternating voltage is generated that is synchronous with the applied pressure and which can be separated from the bias voltage by a simple blocking capacitor arrangement. Lower insulating layer 11 may be eliminated (in this case the sealing layer is nonconductive) but is normally included to facilitate device fabrication. Layers 13 and 17 are usually made of metal, however only one of the two layers need be electronically conductive and the other can be insulating. For example, layer 13 can be insulating and layer 17 conducting or vice versa.

An example of the fabrication of a working transducer having the basic configuration of FIGS. 1a–1d is as follows. With silicon as the substrate material, first insulating layer 11 consists of a 1000 Å thick film of silicon dioxide, $SiO_2$, and an overlying 2000 Å thick layer of silicon nitride, $Si_3N_4$. The latter is advantageous because the etchant used to etch polycrystalline silicon does not significantly attack silicon nitride. Top insulating layer 12 is a 3000 Å thick film of undoped polycrystalline silicon, a high resistivity material. Both conducting layer 13 and sealing layer 17 are vacuum evaporated aluminum with a thickness of 15000 Å. Etch holes 15 are patterned in a two-dimensional array, with each etch hole 15 micrometers in diameter. The polycrystalline silicon 12 is laterally etched under aluminum layer 13 about 30 micrometers. Reasonable limits of these dimensions are that the etch hole is at least 2.5 micrometers in diameter with a size depending upon the amount of lateral etching desired, and that the diameter of void region 16 does not exceed 50 micrometers so as to maintain the mechanical integrity of the aluminum. The foregoing processing is well understood by those skilled in the art and need not be further explained except to mention that the insulating layers are epitaxially grown and that one polycrystalline silicon etchant is a mixture of 1 percent HF and 99 percent nitric acid. This etchant is a low viscosity solution permitting it to flow freely under the aluminum and which has a small rate of attack on silicon nitride and aluminum. Other insulating and conductive materials can be substituted for those given specifically.

Figure 2:
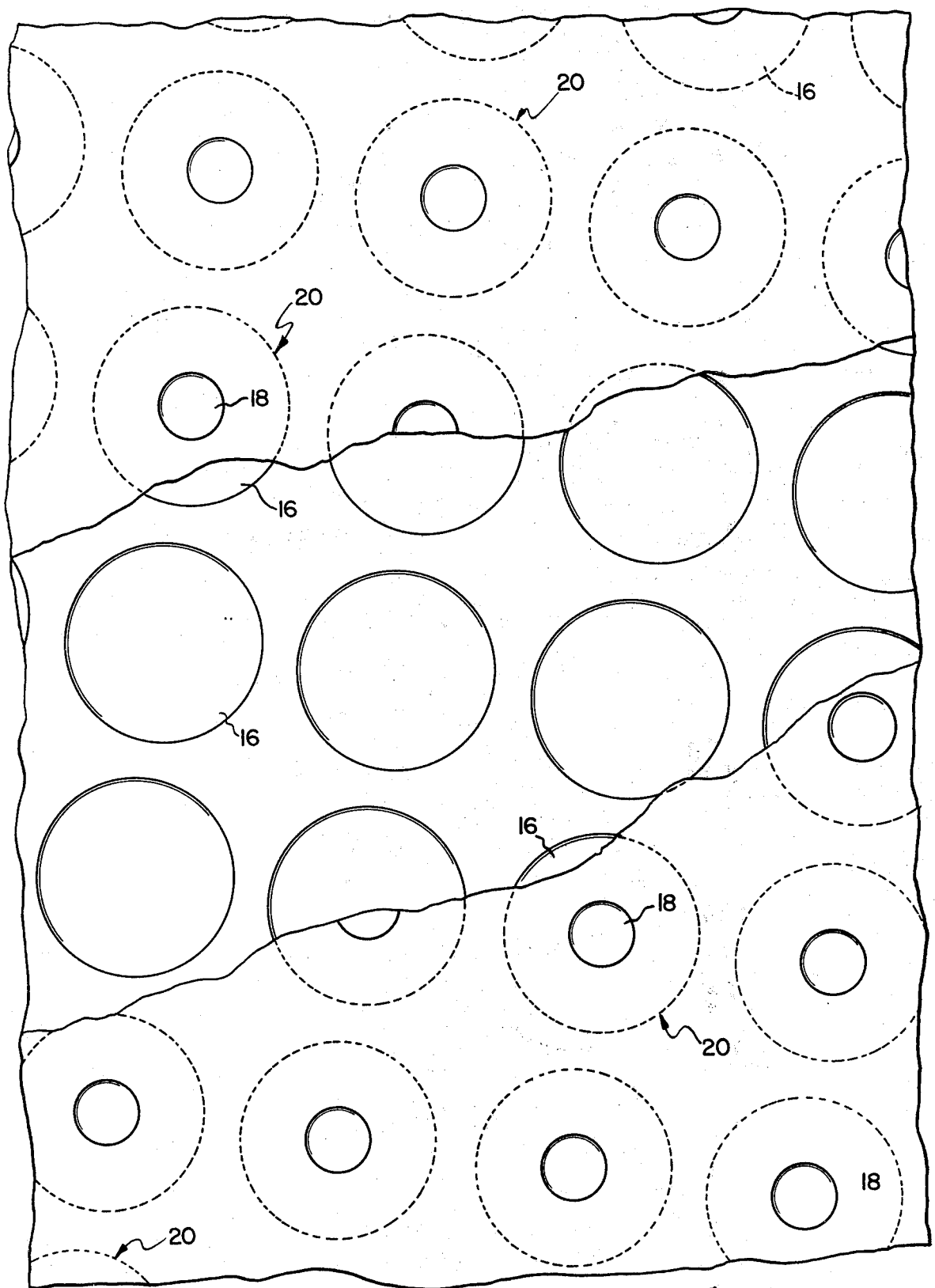
FIG. 2 is a plan view of a transducer array with a metal layer partially removed.

FIG. 2 is a top view of an array of individual electrostatic transducer structures 20 arranged in columns and rows, and the central etch hole closure (18) and circular void region permimeter are readily identified. In the central area, the two aluminum layers 13 and 17 are stripped off to reveal a laterally etched polycrystalline silicon void region (16). When fabricated as a component on a monolithic integrated circuit chip, an array of such transducer structures 20 have continuous aluminum layers and are a transducer element, and the chip usually has a transducer made of a plurality of elements which are separately connected, by means of deposited metallic interconnections, to the integrated circuit electronic processing circuitry.

Figure 3A:
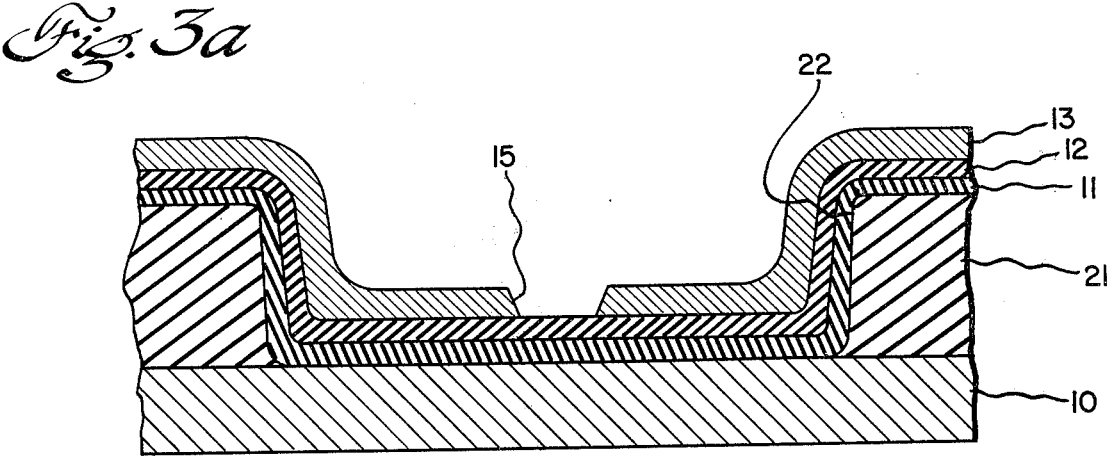
FIGS. 3a–3c are a modification of the foregoing and depict the process sequence for a transducer structure with reduced inactive region capacitance.
Figure 3B:
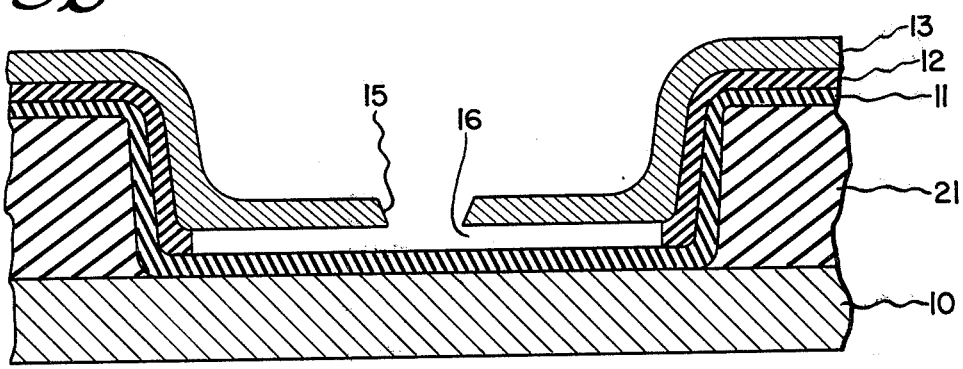
Figure 3C:
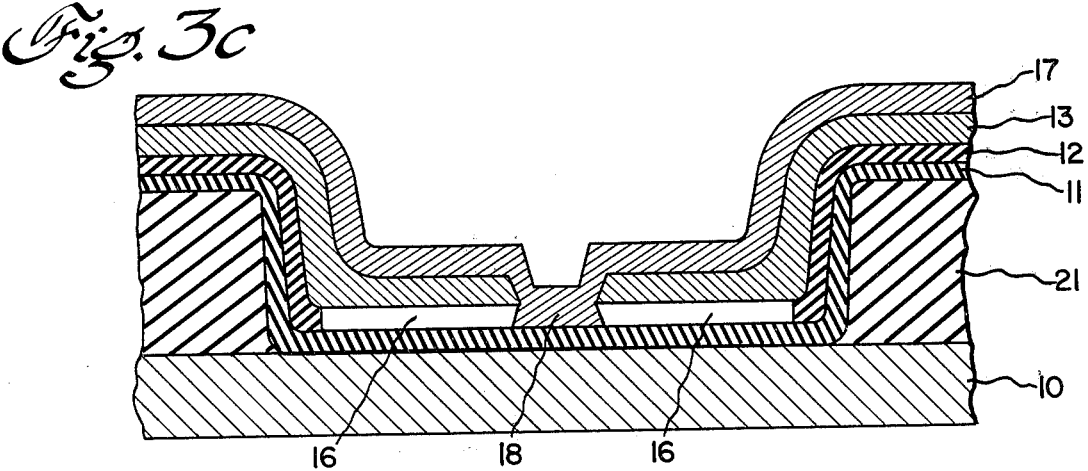

The process sequence for making an electrostatic transducer structure with reduced inactive region capacitance is depicted in FIGS. 3a–3c. The inactive regions are defined as the areas outside of the boundaries of individual transducers 20 (see FIG. 2). An added initial step is that a relatively thick insulating layer, silicon dioxide for a silicon monolithic circuit, is deposited on the substrate surface and etched to have a matrix of large holes defining the active regions of the subsequently processed transducers, which are made in exactly the same way. Referring to FIG. 3a, the thick silicon dioxide layer covering the inactive area is indicated at 21 and a large hole made by photoresist masking and etching techniques is indicated at 22. Insulating layers 11 and 12 of two different materials and conducting layer 13 are now deposited over the egg crate type surface, and small etch holes 15 are made in the conducting layer approximately centered within each large hole 22. Void regions 16 are laterally etched under conducting layer 13, FIG. 3b, and metallic sealing layer 17 is vacuum evaporated over the entire surface, FIG. 3c, to seal off etch holes 15 and void regions 16. The sensitivity of the transducer is directly proportional to the percentage of the total device capacitance which can be modulated by the impinging acoustical energy. The capacitance of a parallel plate capacitor is directly proportional to the plate area, A, and inversely proportional to the distance, t, between the plates. By increasing the thickness of the dielectric material 21 supporting conducting layers 13 and 17, the capacitance of the inactive areas or regions is reduced.

One of the ways the electrostatic transducer can be fabricated as part of a silicon monolithic circuit is illustrated in FIGS. 4a–4f. Many variations are possible in the processing of monolithic integrated circuits but the method described is a preferred approach. The single monolithic integrated circuit has provision for detection of acoustical energy and for amplification and signal processing of received echo signals. the general approach is that a portion of the semiconductor substrate surface is reserved for the transducer array, and standard processing is used to fabricate the integrated circuit for the electronic processing functions up to the stage where contact windows are to be etched. That is, the integrated circuit processing is complete or nearly complete with the exception of etching holes to the active elements or other components to be interconnected, and depositing the metallic interconnections. The several insulating layers required to make the ultrasonic transducer can be deposited over the entire integrated circuit and need not be restricted to the transducer region. Selected areas of these layers are removed when etching the contact windows. Likewise, the metallic conducting and sealing layers required to build the transducer are deposited over the entire integrated circuit and have a dual or triple function of interconnecting the transducer to the integrated circuit and, when properly patterned, connecting to the active elements and interconnecting elements or components of the integrated circuit.

Figure 4A:
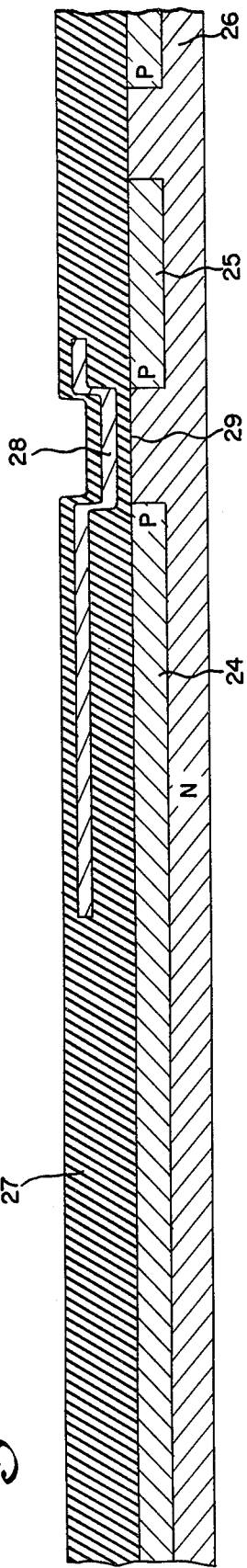
Figure 4B:
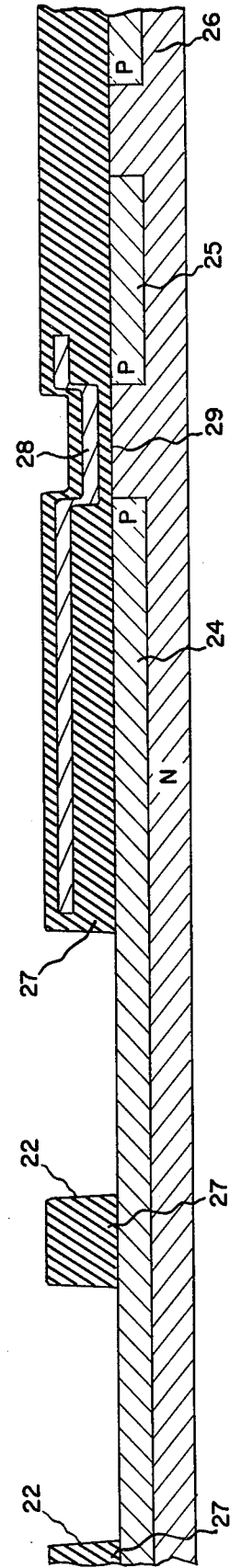
Figure 4C:
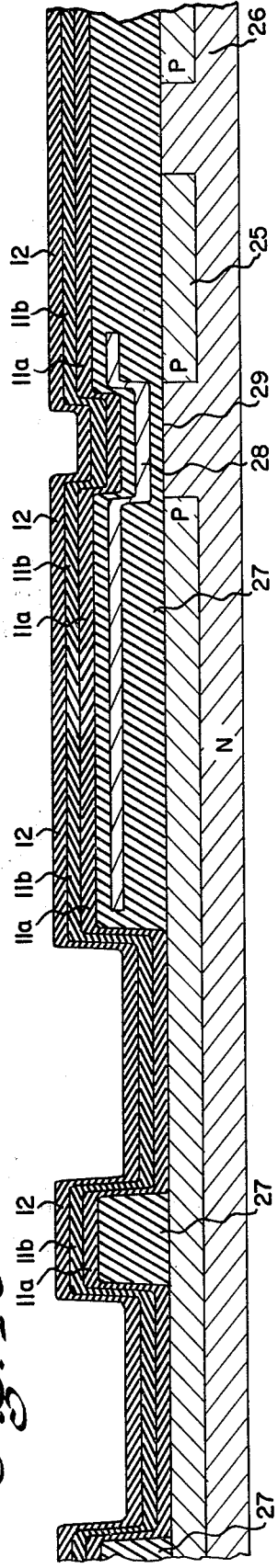

FIG. 4a shows a silicon slice with the integrated circuit ready for contact window etching. A metal oxide semiconductor (MOS) integrated circuit is used in the example but the method works as well with bipolar circuitry. The p-type source region 24 and drain region 25 of a MOS transistor are diffused into the surface of a n-type silicon substrate 26, and on the surface is a layer of silicon dioxide 27 with a buried silicon gate 28 which overlies n-type channel 29 and extends laterally to one side to facilitate the making of a gate contact. Large holes 22 are etched (FIG. 4b) to delineate active areas of the ultrasonic transducer and silicon dioxide remains on the inactive areas. Referring to FIG. 4c, thin continuous insulating layers of silicon dioxide 11a, silicon nitride 11b, and undoped polycrystalline silicon 12 are deposited over the entire transducer region and prefabricated integrated circuit.

After coating the surface with photoresist and exposing to light, contact windows 30 and 31 to silicon gate 28 and drain region 25, FIG. 4d, are etched through all the different insulating layers using etching materials well known in the art. The photoresist mask is removed and a continuous layer of aluminum 13 is deposited over the transducer region and integrated circuit including the contact windows opened to silicon gate 28 and drain region 25. Using photoresist masking techniques, aluminum layer 13 is etched as in FIG. 4e to define the small etch holes 15. Having removed the photoresist and using apertured aluminum layer 13 as a mask, polycrystalline silicon layer 12 is etched laterally under the aluminum to create transducer void regions 16. Second aluminum layer 17 is then vacuum deposited over the entire surface of the transducer region and integrated circuit, FIG. 4f, to seal off etch holes 15 in the first aluminum layer by means of solid plugs 18 that fill the etch hole and contact the underlying layer of silicon nitride. Void regions 16 are thus sealed off and are vacuum gaps in the transducer structure. Finally, the aluminum layers are masked with photoresist and etched to define the transducer elements, a metallic interconnection from at least one element to silicon gate 28, and a metallic drain conductor contacting drain region 25. In general, the aluminum layers are patterned to define the transducer elements, interconnections between the elements and the integrated circuit, and various integrated circuit interconnections. The final structure of the monolithic integrated circuit chip with a silicon integrated transducer and integrated electronic processing circuitry is illustrated in FIG. 4f. Echoes reflected by interfaces in the object being examined are detected as a change in capacitance resulting from a change in the spacing between substrate 10 and metal layers 13, 17 in the active regions of the transducer array. An electrical received echo signal is generated which modulates the gate voltage of the MOS transistor, and the echo signal is amplified and processed by the integrated circuit in a manner known to those skilled in the art.

In conclusion, an ultrasonic sensor is fabricated as an integral part of a monolithic integrated circuit employing materials commonly used in the fabrication of monolithic circuits. The combination of sensing elements and electronic processing circuitry in a single monolithic integrated circuit significantly reduces the difficulty in fabricating the array and makes possible the fabrication of arrays with an increased number of sensing elements. Any kind of integrated circuit can be combined with an ultrasonic electrostatic transducer array on a common substrate.

While the invention has been particularly shown and described with reference to preferred embodiments thereof, it will be understood by those skilled in the art that various changes in form and details may be made therein without departing from the spirit and scope of the invention.

The invention claimed is:

1. A method of fabricating an electrostatic transducer on a monolithic integrated circuit semiconductor substrate comprising the steps of:
   depositing at least a first continuous insulating layer and a second continuous layer in that order on said semiconductor substrate,
   making a plurality of etch holes in said second layer,
   laterally etching said first layer using the apertured second layer as a mask to create void regions which extend from each etch hole laterally beneath the second layer,
   depositing a sealing layer on said second layer which extends into said etch holes and seals off each void region to form a transducer structure capable of sensing received ultrasonic energy, at least one of said second layer and sealing layer being made of conductive material, and
   further including the initial steps of depositing a continuous relatively thick insulating layer on said semiconductor substrate and etching holes in said thick insulating layer corresponding to the active areas of the transducer structures made by the subsequent processing, whereby inactive area capacitance between the transducer structures is reduced.

2. A method of fabricating an electrostatic transducer as an integral part of a monolithic integrated circuit which includes electronic processing circuitry comprising the steps of;
   depositing at least first and second continuous insulating layers and a third continuous conducting layer in that order on a silicon semiconductor substrate,
   making a plurality of etch holes in said conducting layer,
   laterally etching only said second insulating layer using the apertured conducting layer as a mask to create void regions which extend laterally from each etch hole beneath the conducting layer, and
   depositing a continuous sealing layer on said conducting layer which extends through said etch holes and contacts said first insulating layer to seal off each void region and form a transducer structure capable of sensing received ultrasonic energy.

3. The method of claim 2 wherein said first insulating layer is comprised of silicon dioxide and an overlying layer of silicon nitride, said second insulating layer is made of undoped polycrystalline silicon, and said conducting and sealing layers are aluminum.

4. The method of claim 2 or claim 3 further including the initial steps of depositing a continuous relatively thick layer of silicon dioxide on said semiconductor substrate and etching holes in said thick silicon dioxide layer defining the active areas of the transducer structures made by the subsequent processing.

5. A method of fabricating an electrostatic transducer in combination with electronic processing circuitry on a monolithic integrated circuit chip comprising the steps of;
   fabricating the monolithic electronic circuitry on selected regions of a semiconductor substrate up to the stage of making contact windows and interconnections to circuit elements, and reserving a portion of the substrate area as a transducer region,
   depositing at least first and second insulating layers on the surface within the transducer region boundaries and on at least part of said electronic circuitry,
   etching contact windows to selected circuit elements,
   depositing a third layer on said second layer and making a pattern of etch holes in said layer within the transducer region boundaries,
   laterally etching said second insulating layer using the apertured third layer as a mask to create void regions which extend from each etch hole laterally beneath the third layer,
   depositing a conductive sealing layer on at least said third layer which extends through said contact windows and into said etch holes to seal off each void region and form a transducer structure capable of sensing received ultrasonic energy, and etching at least said sealing layer to provide interconnections for the transducer and monolithic electronic circuitry.

6. The method of claim 5 wherein the step of fabricating monolithic electronic circuitry includes depositing a relatively thick insulating layer on the substrate within the transducer region, and etching holes in said thick insulating layer corresponding to the active areas of the transducer structures made by the subsequent processing, whereby inactive area capacitance between the transducer structures is reduced.

7. A method of fabricating an electrostatic transducer array in combination with electronic processing circuitry on a monolithic integrated circuit chip comprising the steps of;

fabricating the monolithic electronic circuitry on selected regions of a semiconductor substrate up to the stage of etching contact windows to an active circuit element and including incidental to such fabrication the deposition of a relatively thick insulating layer on a reserved transducer region, etching holes in said thick insulating layer corresponding to the areas of the transducer structures to be made, depositing other continuous thin insulating layers on the apertured thick insulating layer and on at least part of said electronic circuitry, etching contact windows through all the thin insulating layers to the active element, depositing a continuous conducting layer on the uppermost thin insulating layer and through the contact windows connecting to the active element, making a pattern of etch holes in the conducting layer within the transducer region boundaries, laterally etching only the uppermost thin insulating layer using the apertured conducting layer as a mask to create void regions which extend laterally from each etch hole beneath the conducting layer, depositing a continuous conductive sealing layer on said conducting layer which extends through said etch holes and contacts the underlying thin insulating layer to seal off each void region and form a transducer structure capable of sensing received ultrasonic energy, and etching said conducting and sealing layers to provide interconnections for the transducer array and for the active element and monolithic electronic circuitry.

8. The method of claim 7 wherein said continuous thin insulating layers are made of silicon dioxide, silicon nitride and polycrystalline silicon, and said conducting and sealing layers are aluminum.

* * * * *